US006844941B1

(12) United States Patent
Sharma et al.

(10) Patent No.: US 6,844,941 B1
(45) Date of Patent: Jan. 18, 2005

(54) COLOR HALFTONING USING A SINGLE SUCCESSIVE-FILLING HALFTONE SCREEN

(75) Inventors: Gaurav Sharma, Webster, NY (US); Zhigang Fan, Webster, NY (US); Shen Ge Wang, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 940 days.

(21) Appl. No.: 09/602,746

(22) Filed: Jun. 23, 2000

(51) Int. Cl.[7] .............................................. H04N 1/52
(52) U.S. Cl. ...................... 358/1.9; 358/536; 358/3.19
(58) Field of Search ........................ 358/534, 1.9, 3.15, 358/3.01, 3.03, 3.06, 3.07, 502, 298, 3.05, 515, 3.19, 3.1, 3.21; 382/162, 100

(56) References Cited

U.S. PATENT DOCUMENTS

| | | | | |
|---|---|---|---|---|
| 4,149,194 A | | 4/1979 | Holladay | 358/283 |
| 5,138,671 A | * | 8/1992 | Yokoyama | 382/172 |
| 5,363,318 A | | 11/1994 | McCauley | 364/999.9 |
| 5,565,994 A | * | 10/1996 | Eschbach | 358/3.03 |
| 5,631,748 A | * | 5/1997 | Harrington | 358/502 |
| 5,673,121 A | | 9/1997 | Wang | 358/456 |
| 5,696,612 A | * | 12/1997 | Thornton | 358/534 |
| 5,786,906 A | * | 7/1998 | Shishizuka | 358/500 |
| 6,014,233 A | * | 1/2000 | Fan et al. | 358/515 |
| 6,072,591 A | | 6/2000 | Harrington | 358/1.9 |
| 6,118,485 A | * | 9/2000 | Hinoue et al. | 348/373 |
| 6,501,567 B2 | * | 12/2002 | Sharma et al. | 358/3.19 |
| 6,535,630 B1 | * | 3/2003 | Saeki | 382/162 |
| 2002/0102007 A1 | * | 8/2002 | Wang | 382/100 |
| 2003/0128394 A1 | * | 7/2003 | Mantell et al. | 358/3.06 |
| 2003/0128395 A1 | * | 7/2003 | Sharma et al. | 358/3.06 |
| 2003/0133160 A1 | * | 7/2003 | Sharma et al. | 358/3.06 |
| 2003/0214676 A1 | * | 11/2003 | Yamada et al. | 358/3.05 |

FOREIGN PATENT DOCUMENTS

JP  2000152163  * 5/2000 .......... H04N/5/907

OTHER PUBLICATIONS

Joseph Shu, Chia–Hsin Li, Hakan Ancin, Anoop Bhattacharjya, "Color Stochastic Screening with Smoothness Enhancement", IS&T's NIP 13: 1997 International Conference on Digital Printing Technologies.

Balasubramanian, Raja, "Optimization of the spectral Neugebauer model for printer characterization", *Journal of Electronic Imaging*, Apr. 1999, vol. 8(2), pp. 156–166.

Balasubramanian, Raja and Maltz, Martin S., "Refinement of printer transformations using weighted regression", SPIE, vol. 2658, 0–8194–2032, Aug. 1996, pp. 334–340.

* cited by examiner

*Primary Examiner*—Scott A. Rogers
(74) *Attorney, Agent, or Firm*—Fay, Sharpe, Fagan, Minnich & McKee, LLP (57) ABSTRACT

A method is provided for rendering a color image with a plurality of separations with a halftone process using a single screen for a plurality of separations. The screen is comprised of a plurality of pixel locations with associated threshold values and the image is comprised of a plurality of separation values. The method includes the steps of rendering a first one of the plurality of separations in accordance with the screen, wherein the plurality of pixel locations are turned on or off at a given pixel location based on a comparison of the image separation value at that pixel with the screen threshold value. The rendering of the next color separation is made in accordance with the rendering of the first separation and the screen, wherein for constant image separation values, pixel locations are turned on for the separation at pixel locations disposed in a highest available luminance region having a lowest available threshold value.

18 Claims, 4 Drawing Sheets

COLOR HALFTONING USING A SINGLE SUCCESSIVE-FILLING HALFTONE SCREEN

FIELD OF THE INVENTION

The subject invention pertains to the art of color image/text printing or display systems, and is especially applicable to a method and apparatus wherein color halftoning (representing a continuous tone image with a binary representation) is implemented with a single stochastic screen for maximal ink dispersion and optimized spatial frequency response in the printing or display process.

BACKGROUND OF THE INVENTION

In today's business and scientific world color has become essential as a component of communication. Color facilitates the sharing of knowledge and ideas. Companies involved in the development of digital color print engines are continuously looking for ways to improve the accuracy and total image quality of their products.

Color images are commonly represented as one or more separations, each separation comprising a set of color density signals for a single primary or secondary color. Color density signals are commonly represented as digital gray or contone pixels, varying in magnitude from a minimum to a maximum, with a number of gradients between corresponding to the bit density of the system. Thus, a common 8bit system provides 256 shades of each primary color. A color can therefore be considered the combination of magnitudes of each pixel, which when viewed together, present the combination color. Usually, printer signals include three subtractive primary color signals (Cyan, Magenta and Yellow) and a Black signal which together can be considered the printer colorant signals. Each color signal forms a separation and when combined together with the other separations, forms the color image.

Printers commonly provide a limited number of output possibilities, and are commonly binary, i.e., they produce either a dot or no dot at a given pixel location. Thus, given a color separation with 256 shades of each additive primary color, a set of binary printer signals must be produced representing the contone effect. This process is referred to as halftoning. In such arrangements, over a given area and the separation having a number of contone pixels therein, each pixel value of an array of contone pixels within the area is compared to one of a set of preselected thresholds (the thresholds may be stored as a dither matrix and the repetitive pattern generated by this matrix is considered a halftone cell) as taught for example in U.S. Pat. No. 4,149,194 to Holladay. The effect of such an arrangement is that, for an area where the image is a contone, some of the thresholds in the matrix will be exceeded, i.e., the image value at that specific location is larger than the value stored in the dither matrix for that same location, while others are not. In the binary case, the pixels or cell elements for which the thresholds are exceeded might be printed as black or some color, while the remaining elements are allowed to remain white or uncolored, dependent on the actual physical quantity described by the data. Since the human visual system tends to average out rapidly varying spatial patterns and perceives only a spatial average of the micro-variation in spot-color produced by a printer, the halftone process described above can be used to produce a close approximation to the desired color in the contone input.

The dither matrix of threshold values is often referred to as a "screen", and the process of generating the binary image from the contone image using the screen is called "screening". Conventional digital halftones start as a number of isolated dots which grow bigger as more colorant is requested on the paper. These screens are referred to as clustered-dot screens. The fundamental rate at which the dots in a clustered dot screen are repeated in commonly referred to as the screen's spatial frequency [Note R. Ulichney, "Digital Halftoning", MIT Press, Cambridge, Mass., 1987]. The higher the screen spatial frequency, the finer and smoother appearing the image and also the greater is the capacity for the dots to represent fine detail in the image. Dithering creates problems in color document reproduction where the repeating pattern of a screen through the image, when superposed over similar repeating patterns in multiple separations, can cause moiré or other artifacts, particularly in a printing system with less than ideal registration between separations.

Stochastic, or non-periodic screening is an alternative to conventional clustered dot screens. Instead of producing dots that grow with increased colorant on paper, the stochastic screening method produces a well-dispersed pattern of isolated dots at spaced pixel locations. Thus there is no fundamental periodicity in the dots, instead the design of the screen attempts to produce patterns with pleasant noise characteristics. The pleasant noise characteristics are achieved by designing the screen so as to distribute the noise energy in the region of high spatial frequency, where the human visual system has a significantly reduced sensitivity. In this respect, U.S. Pat. No. 5,673,121 to Wang, discloses a stochastic halftone screening method for designing an idealized stochastic screen and is herein incorporated by reference as it discloses a particular stochastic screen useful in implementation of the subject invention, as will be more fully explained below. One of the advantages of stochastic, or non-periodic screening over periodic screening, is the suppression of moiré.

Color stochastic screening has typically been implemented in the prior art by using the same screen for all separations (dot-on-dot) or by using independent screens (possibly obtained by shifting/rotating/flipping a single screen). These methods do not produce halftones with maximal ink dispersion and optimized spatial frequency response because there is no control of interseparation overlaps. The less successful the screening processes, the less smooth, i.e. more grainy, the resultant image appears. It is of course an overall objective of the subject invention to produce a resultant image in which the graininess is minimized, smoothness is enhanced and the intended colors are accurately reproduced. Related methods have been proposed for error diffusion and screening in U.S. Pat. No. 6,072,591 and in U.S. Pat. No. 5,631,748 to Harrington, and in the publication "Color Stochastic Screening with Smoothness Enhancement", by J. Shu, C. H. Li, H. Ancin, and A. Bhattarcharjya, IS&T's NIP13: 1997 International Conference on Digital Printing Technologies.

BRIEF SUMMARY OF THE INVENTION

The subject invention describes a method for halftoning a color image using only a single stochastic screen. The halftone algorithm achieves the goals of good dispersion of printed dots for different separations and results in an output image with good spatial frequency characteristics for the combinations of the separations. This goal is achieved by halftoning the color separations (for instance C, M, Y, and K) of the image sequentially according to a chosen ordering. The first separation is halftoned using the normal process of screening. Each subsequent separation is halftoned so as to minimize overlap with the previously halftoned separations and to result in optimal spatial distribution of the dots as defined by the stochastic screen. For the illustration of the invention, this disclosure will often assume that the image to be halftoned is a spatially constant image, though it should be clear that the invention and its benefits are equally applicable to other images. For a spatially constant image, when halftoning a separation in the presence of previously halftoned separations, the method of this invention places the on pixels for the separation being halftoned on the lightest available pixel regions and within these regions at the spatial locations corresponding to the lowest thresholds for the stochastic screen. The rule for placement of new dots on the lightest available region achieves maximal ink dispersion, i.e., there is no overlap of inks unless necessary and overlap of lighter inks occurs before overlap of darker inks and the rule of placing the new dots first in the lowest available thresholds, ensures that the overall spatial frequency characteristics are optimized by having the darkest dots most uniformly distributed, then the next darkest dots and so on.

In accordance with the present invention a method is provided for rendering a color image with a plurality of separations with a halftone process using a single screen for a plurality of separations. The screen is comprised of a plurality of pixel locations with associated threshold values and the image is comprised of a plurality of separation values. The method includes the steps of rendering a first one of the plurality of separations in accordance with the screen, wherein the plurality of pixel locations are turned on or off at a given pixel location based on a comparison of the image separation value at that pixel with the screen threshold value. The rendering of the next color separation is made in accordance with the rendering of the first separation and the screen, wherein for constant image separation values, pixel locations are turned on for the separation at pixel locations disposed in a highest available luminance region having a lowest available threshold value.

In accordance with a more limited aspect of the present invention, the renderings of the next color separations are ordered in accordance with increasing luminance for successively rendered separations.

In accordance with yet another more limited aspect of the present invention, when the filling of the pixel locations requires an overlap filling, the overlap filling is made at pixel locations disposed in a highest available luminance region having a lowest available threshold value of a predecessor separation.

One advantage of the present invention is a color halftoning process which enhances smoothness of image display by producing halftones with maximal ink dispersion and optimized spatial frequency response.

It is another advantage of the subject invention that a stochastic screening using the same screen for all separations provides a more expeditious processing for halftoning a color image.

Other advantages and benefits of the present invention will become apparent to those of ordinary skill in the art upon a reading and understanding of the following detailed description of the preferred embodiments.

BRIEF DESCRIPTION OF THE DRAWINGS

The invention may take form in various components and arrangements of components. The drawings are only for purposes of illustrating the preferred embodiments and are not to be construed as limiting the invention. Where.

DETAILED DESCRIPTION OF THE PREFERRED EMBODIMENT

Referring now to the drawings wherein the showings are for purposes of illustrating preferred embodiments of the invention only and not for limiting same, the invention describes a way of halftoning a color image using only a single stochastic screen. The different separations are processed in order of decreasing luminance modulation (i.e., successive separations produce smaller and smaller changes in luminance, for printing this order is from the darkest printing separation to the lightest) and are biased so as to target different thresholds of the stochastic screen. The biasing is done so as to achieve three objectives: (1) "area coverage" for each color is preserved, (2) the inks are maximally dispersed, i.e., there is no overlap unless necessary and overlap of lighter inks occurs before overlap of darker inks, and (3) the spatial frequency optimization of the stochastic screen is used optimally by having the darkest dots occupy the lowest thresholds.

Color stochastic screening has typically been performed by using either the same screen for all separations (dot-on-dot) or by using independent screens (possibly obtained by shifting/rotating a single screen). These methods do not produce halftones with maximal ink dispersion and overall optimized spatial frequency response. In this invention, a method is taught for halftoning an image using a single stochastic screen that produces halftones with maximal ink dispersion and optimized spatial frequency response.

A principal feature of this invention is to process the image separations in order of decreasing luminance modulation, for a CMYK printer this order is typically K, M, C, Y. For each separation, the number of dots printed is decided by the input digital value for that separation and the placement of the dots is done so as to have the dots first fill-in regions of highest luminance and then move to regions of successively decreasing luminance. In each region of constant luminance, the dots are placed so as to occupy the lowest available thresholds in the stochastic screen first. Since the screen is designed to have optimal frequency response when the lower levels are filled first, this method ensures that the darkest dots occupy the regions with the best frequency response characteristics. The above goals are achieved by first biasing each separations digital value suitably and then halftoning each separation using the same basic stochastic screen. The description of the algorithm below will illustrate this idea more clearly. For the present description, the example of an 8-bit CMYK image is used, though the method could be generalized to any number of bits and other printing inks. Furthermore, the invention is described as using a 256×256 stochastic screen for explanation, any size stochastic screen can be used in practice.

Figure 3A:
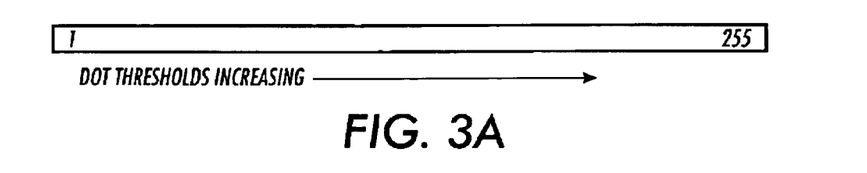
FIGS. 3a–3e comprise exemplary representations of color separation dot filling in terms of thresholds between 1 and 255, i.e., an 8-bit binary signal representation.

The stochastic screen is assumed to be linear in the number of pixels turned on. The stochastic screen is an array of thresholds between 1 and 255 (FIGS. 3a–3e). When halftoning an image (one separation), a pixel is turned on if the image value at that pixel exceeds the threshold. The linearity of the dot implies that when a constant image with value V is halftoned, the fraction of the pixels turned on in the output is V/255 (or the nearest obtainable approximation) for all values of V between 0 and 255. In order to better explain the idea of this invention, the dot is represented by its thresholds as shown in FIG. 3a. The linear array in FIG. 3a represents the thresholds of the dot in increasing order from left to right, going from 1 to 255. In this representation, each threshold represents all the pixels that get turned on just when the image reaches that value. A particular threshold or threshold region of the dot is filled by a given separation to indicate that the dots of that separation completely cover the pixels corresponding to that threshold/threshold region.

The stochastic screen is designed in accordance with the method described in U.S. Pat. No. 5,673,121 to Wang. This method optimizes the screen spatial frequency characteristics, when it is filled successively starting from a threshold of 1 and moving up to a level of 255. Thus, the pixel pattern with thresholds 1 and 2 filled up has a more "pleasing" distribution of dots than the pattern with thresholds 1 and 255 filled up, even though they have exactly the same number of pixels turned on (the latter claim is due to the linearity of the dot).

The eye is more sensitive to high frequency variations in luminance than to variations in chrominance. In order to obtain a more uniform luminance distribution, it is desirable to have the dots for the different separations well dispersed with minimal overlap between separations. In addition to the requirement for minimizing overlap, based on the characteristics of the stochastic screen mentioned above, the spatial distribution of the dots will be pleasing if the dots for all the printed separations are placed at the pixel locations corresponding to the lowest thresholds that they can occupy. Furthermore, the dots with the lowest luminance are placed at the lowest threshold levels because their spatial distribution will cause the most visible variation in luminance.

Figure 3B:
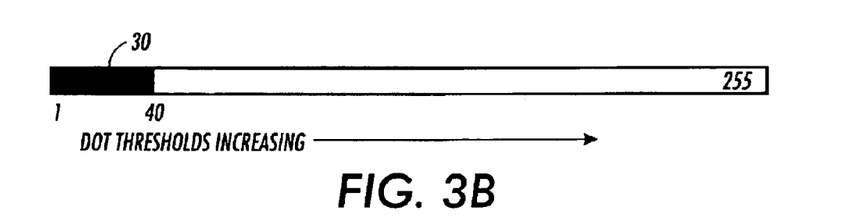

As a specific example, consider the halftoning of an image with a Black value of $i_K$=40 and a magenta value of $i_M$=60, with other separations at zero. For the description, it will be assumed that the image is processed one separation at a time with the separations processed in order of decreasing "luminance-modulation", i.e., in the order K., M, C, Y. Since the black separation is the darkest, the black dots are placed in the lowest 40 thresholds of the halftone screen. This is represented in FIG. 3b as area 30.

Figure 3C:
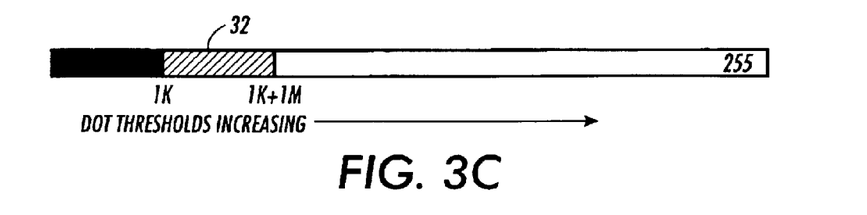

Next the magenta separation is halftoned. For maximal dispersion, the invention avoids overlap between K and M, if possible. The value of $i_M$=60 is small enough so that overlap can be avoided with existing K dots. The overlap is avoided by having the magenta dots fill thresholds other than the thresholds from 0 to $i_K$=40 that are already occupied by K. Furthermore, in order to have the optimal spatial dispersion of the dots, we would like to have the magenta dots occupy the lowest available thresholds in the stochastic screen. Clearly, the placement of the magenta dots is optimized if they occupy the levels from 41 to 100. Thus after the magenta separation is halftoned the filling of the thresholds of the stochastic screen with the K and M dots is as shown in FIG. 3c as area 32.

Figure 3D:
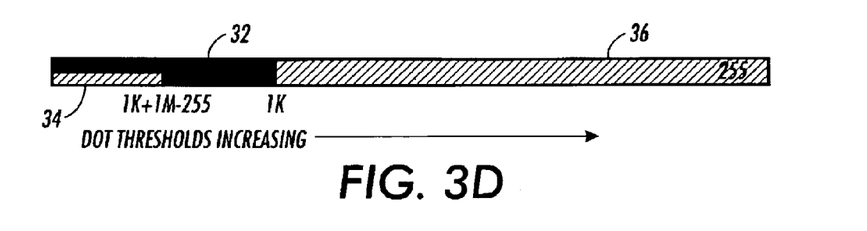

If the magenta value exceeded, 255-$i_K$, overlap between K and M would be necessary. Since this overlap would result in dots darker than K the overlap dots are placed in the lowest thresholds of the screen, resulting in an overall configuration as shown in FIG. 3d as area 34.

Note that the desired placement for the M pixels in the stochastic screen thresholds can be achieved by simply modifying the magenta separation prior to halftoning with the threshold array as follows: add $i_K$ to the magenta separation image over the regions over which there are no K dots and ($i_K$–255) over the region with K dots. This can be summed up in a single statement as add ($i_K$(m,n)–$b_K$(m,n)) to the magenta separation prior to halftoning, where (m,n) denotes the pixel coordinates, $i_K$ (m,n) is the contone K separation input at that pixel location and $b_K$ (m,n) is the halftone K separation, which is a bilevel image taking values 0 in the regions with no K and 255 in regions with K.

The method can be similarly generalized to determine the processing for the C and Y separations by considering the processing for constant images (i.e., images for which the CMYK values are the same at all pixels). For each separation, the adjustment in values is determined based on the output halftone values for the previous separations and the input contone values for those separations. For example, consider the Cyan separation halftoning and the required modification in a region where $b_K$ (m,n)=0 and $b_M$ (m,n)=255. There are two possible cases that could have resulted in this set of output values, which can be appreciated with reference to FIGS. 3c and 3d (note that these cases assume that the image is spatially constant for this development) where the regions corresponding to $b_K$ (m,n)=0 and $b_M$ (m,n)=255 are shown as areas 32 and 36, respectively, for the two cases.

Note that in both cases, the lowest threshold value for the halftone screen for the region in consideration for present filling with Cyan is one more than the highest threshold filled by the black separation. In FIG. 3c, the region of consideration is area 32 and in FIG. 3d, the region of consideration is area 36. In other words, the region in consideration (defined as the region with $b_K$ (m,n)=0 and $b_M$ (m,n)=255) begins at a threshold value of $i_K$+1 (the highest threshold value for the region in consideration can also be deduced but is not required). Now for the Cyan separation, for the case shown in FIG. 3c, the region in consideration should start filling with cyan pixels once the white region has been filled with Cyan, i.e., starting at Cyan value (255–($i_K$+$i_M$))+1, and for the case shown in FIG. 3d, the filling of the region in consideration should begin at at Cyan value of 1. Thus the starting value of Cyan for filling the region in consideration (in either case) is given by min(0, 255–($i_K$+$i_M$))+1, Thus if the value to be added to the Cyan separation in order to modify it is D, when D is added to the starting Cyan value, it should just equal the first threshold value in this region, i.e., $$\min(0, 255-(i_K+i_M))+1+D=i_K+1$$

or $$D = i_K - \min(0, 255 - (i_K + i_M))$$
$$= (i_K(m, n) - b_K(m, n)) + (i_M(m, n) - (b_M(m, n)) +$$
$$\min(-(i_M(m, n) - b_M(m, n)), (i_K(m, n) - b_K(m, n)))$$
$$= e_K(m, n) + e_M(m, n) + \min(-e_M(m, n), e_K(m, n))$$

where $$e_K(m,n)=(i_K(m,n)-b_K(m,n))$$
$$e_M(m,n)=(i_M(m,n)-b_M(m,n))$$

are the halftone errors for the K and M separations.

Figure 4:
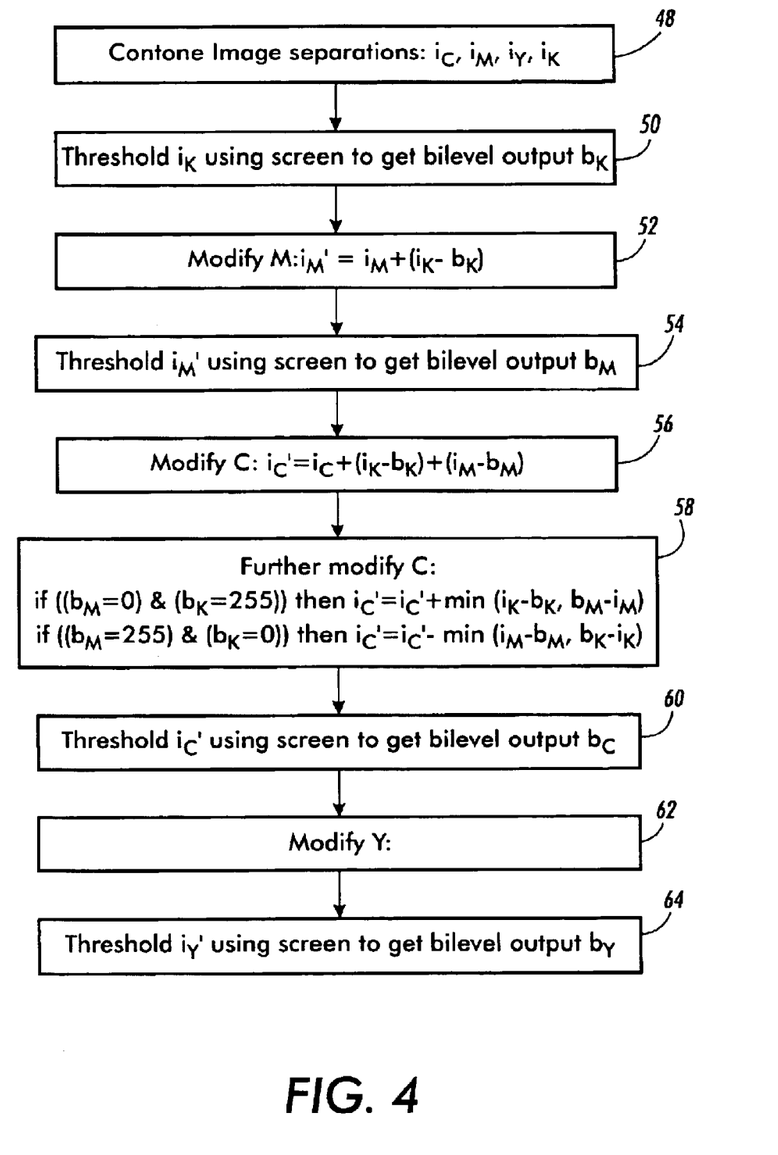
FIG. 4 is a flowchart illustrating the steps of the method of the subject invention.

Through similar arithmetic the required modifications for the C and Y separation can be determined in all cases. With reference to FIG. 4, the complete algorithm for processing a CMYK image can then be stated as:
1. Separate image into CMYK contone separations $i_C(m,n)$, $i_M(m,n)$, $i_Y(m,n)$, $i_K(m,n)$ (Block 48)
2. Threshold K separation $i_K(m,n)$ using the stochastic screen to get binary K output $b_K(m,n)$. Throughout this description, it will be assumed that the threshold based halftoning process converts a contone image (with values from 0 through 255) to a bi-level image that has only values 0 to 255. (Block 50)
3. Calculate K separation halftone error map $e_K(m,n)=i_K(m,n)-b_K(m,n)$
4. Calculate modified magenta separation by computing $$i'_M(m,n)=i_M(m,n)+e_K(m,n) \text{ (Block 52)}$$

5. Threshold modified M separation $i'_M(m,n)$ using stochastic screen to get binary M output $b_M(m,n)$ (Block 54)
6. Calculate M separation halftone error map $e_M(m,n)=(i_M(m,n)-b_M(m,n))$
7. Calculate modified Cyan separation by
   a) Computing $i'_C(m,n)=i_C(m,n)+e_K(m,n)+e_M(m,n)$ (Block 56)
   b) Modify values further in selected regions:
      If $((b_M(m,n)=255)$ and $b_K(m,n)=0)$ then $i'_C(m,n)=i'_C(m,n)+\min(e_K(m,n), -e_M(m,n))$
      else if $((b_M(m,n)=0)$ and $b_K(m,n)=255)$ then $i'_C(m,n)=i'_C(m,n)-\min(e_M(m,n)-e_K(m,n))$ (Block 58)
8. Threshold modified C separation $i'_C(m,n)$ using stochastic screen to get binary C output $b_C(m,n)$ (Block 60)
9. Calculate C separation halftone error map $e_C(m,n)=i_C(m,n)-b_C(m,n)$
10. Calculate Modified Yellow separation by
    a) Computing $i'_Y(m,n)=i_Y(m,n)+e_K(m,n)+e_M(m,n)+e_C(m,n)$
    b) Modify values further in selected regions:
       If $((b_K(m,n)=0)$ and $(b_M(m,n)=0)$ and $b_C(m,n)=255))$ then $i'_Y(m,n)=i'_Y(m,n)+\min(-e_C(m,n), e_K(m,n)+e_M(m,n))$
       else if $((b_K(m,n)=0)$ and $(b_M(m,n)=255)$ and $b_C(m,n)=0))$ then $i'_Y(m,n)=i'_Y(m,n)+\max(-e_C(m,n), \min(0, e_K(m,n)+e_M(m,n))+\min(e_K(m,n), -e_M(m,n))$
       else if $((b_K(m,n)=0)$ and $(b_M(m,n)=255)$ and $(b_C(m,n)=255))$ then $i'_Y(m,n)=i'_Y(m,n)+\min(e_K(m,n)-e_C(m,n), -(e_C(m,n)+e_M(m,n)), (e_K(m,n)-(e_M(m,n)), 2e_K(m,n))$
       else if $((b_K(m,n)=255)$ and $(b_M(m,n)=0)$ and $(b_C(m,n)=0))$ then $i'_Y(m,n)=i'_Y(m,n)-\min(e_M(m,n)+e_C(m,n), e_M(m,n)-e_K(m,n), -2e_K(m,n))$
       else if $((b_K(m,n)=255)$ and $(b_M(m,n)=0)$ and $(b_C(m,n)=255))$ then $i'_Y(m,n)=i'_Y(m,n)+\min(\max(0, e_K(m,n)+e_M(m,n)), -e_C(m,n))-\min(e_M(m,n), -e_K(m,n))$
       else if $((b_K(m,n)=255)$ and $(b_M(m,n)=255)$ and $(b_C(m,n)=0))$ then $i'_Y(m,n)=i'_Y(m,n)-\min(e_C(m,n), -e_K(m,n))$ (Block 62)
11. Threshold modified Y separation $i'_Y(m,n)$ using stochastic screen to get binary Y output $b_Y(m,n)$ (Block 64)

Figure 3E:
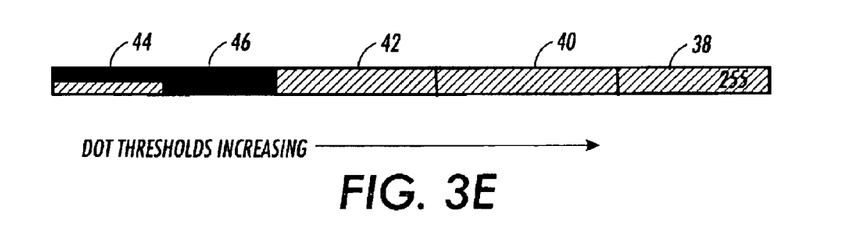

FIG. 3e illustrates the algorithm implementation for multiple overlaps where area 38 is C, area 40 is an overlap of C and Y, area 42 is an overlap of M and C, and area 44 is an overlap of C and K. Area 46 is K.

For the purpose of making the description simpler, it was assumed that the entire image was separated into CMYK contone separations. In practice, the algorithm can be applied pixel-by-pixel or scanline-by-scanline or block-by-block over an arbitrary shape and size block, and it is not necessary to break the image into separations. Additionally, the above description is not geared towards computation, and several of the comparisons above would be unnecessary in actual implementation. Note also that while the description of the above development has been motivated by considering images which are spatially constant, i.e., images in which the CMYK values are the same for all pixels, the algorithm (or any other equivalent form thereof) can be used with any image in practice. This is also the primary reason for stating the algorithm with the built in dependence on the spatial coordinates (m,n). Since the rate of variation in an image is much slower than the pixel sampling rate, the algorithm is equally beneficial in real images in providing improved dispersion and optimal frequency characteristics.

The major computation in the above algorithm is for the halftoning of the last separation (Y). Since Yellow causes very little luminance modulation and typically has the least unwanted absorption, the performance would not deteriorate significantly even if the yellow separation is halftoned totally independently using a separate screen. One compromise is to utilize the conjugate or the "reverse-order" filling screen for yellow, which still ensures minimal overlap and overlaps lighter separations first before overlapping darker separations.

Figure 1:
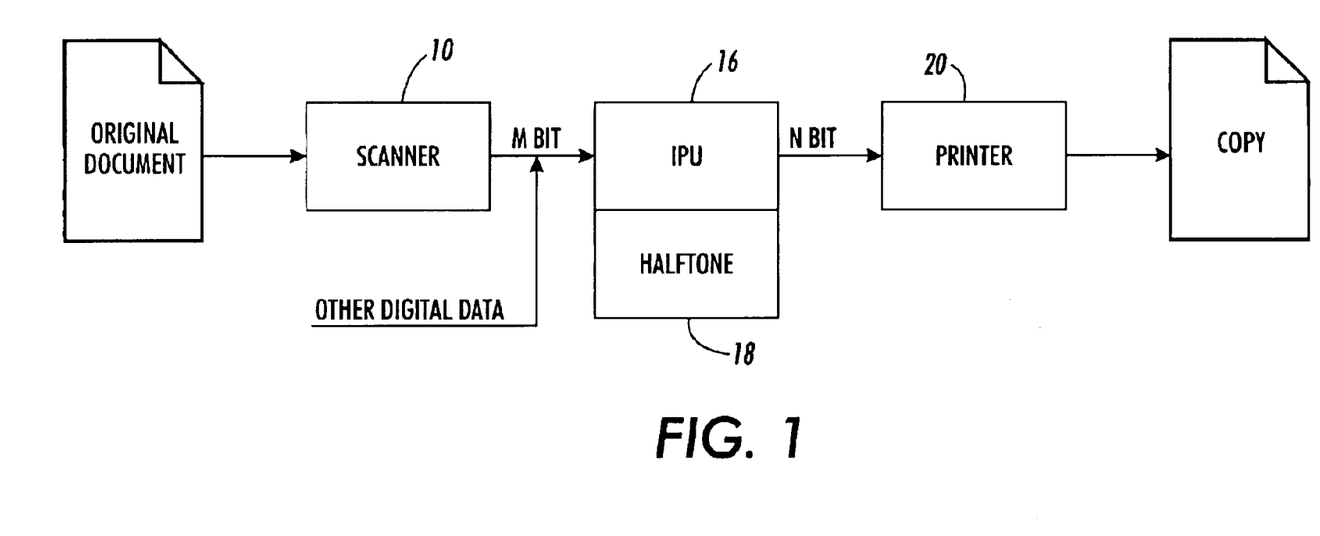
FIGS. 1 and 2 represent a halftoning system in which the present invention finds use.

With reference now to FIG. 1, which shows general system requirements representing the goal of the invention, an electronic representation of an original document (an image) from an image input terminal such as scanner 10 derives electronic digital data in some manner, in a format related to the physical characteristics of the device, and commonly with pixels defined at m bits per pixel. Common color scanners, such, for example, Xerox 5775 Digital Color Copiers, or the Pixelcraft 7650C, produce 8 bit/pixel data, at resolutions acceptable for many purposes. Since this is a color document, the image is defined with two or more separation bitmaps, usually with identical resolution and pixel depth. The electronic image signals are directed through an image processing unit (IPU) 16 to be processed so that an image suitable for reproduction on image output terminal or printer 20 is obtained. Image processing unit 16 commonly includes a halftone processor 18 which converts m bit digital image signals to n bit digital image signals, suitable for driving a particular printer, where m and n are integer values. It is also well within the contemplation of the present invention, to derive images electronically. In such cases, the images may be represented by a page description language file, describing the appearance of the page. In such a case, the IPU might include a processing element for decomposition of the page, and color conversions elements for providing appropriate signals for driving a printer.

Figure 2:
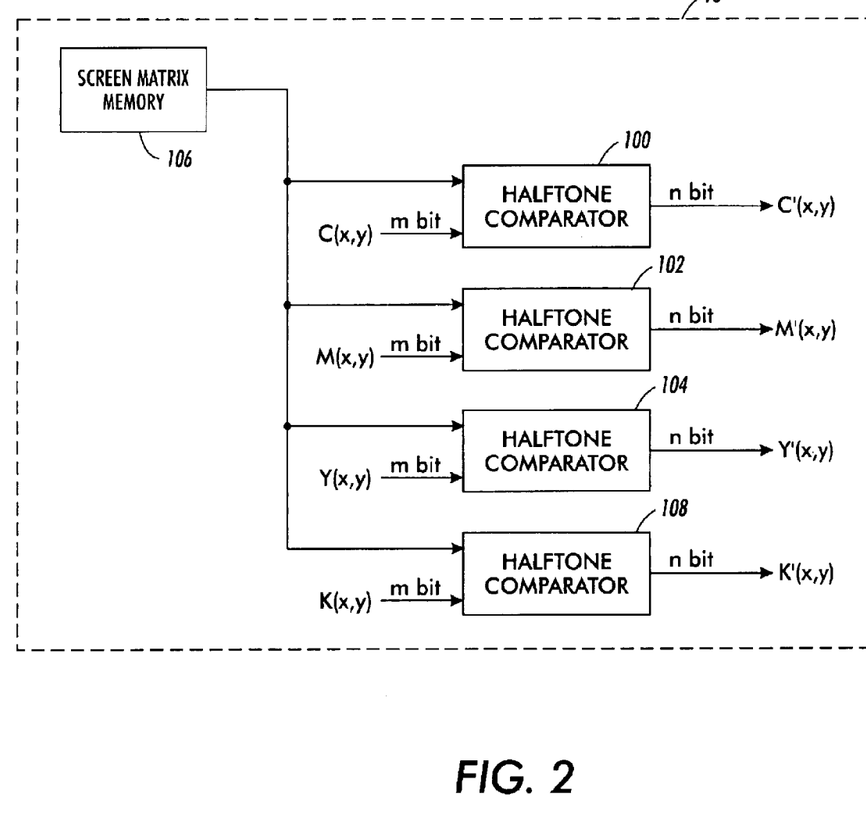

FIG. 2. shows the halftone processor 18 operational characteristics. In this example, there is illustrated a color processing system, using four separations, C(x, y), M(x,y), Y(x,y), K(x,y), obtained and each processed independently for halftoning purposes to reduce an m-bit input to an n-bit output. It will be appreciated that the invention is also applicable to the "single separation" or black and white reproduction situation as well. Accordingly, a source of screen matrix information is shown, screen matrix memory 106, which provides one input to each comparator 100, 102, 104, 106 and 108 for each separation, where the other comparator is the m bit separation bitmap. The output is m bit output, which can be directed to a printer. This illustration is highly simplified, in that distinct screen matrices may be supplied to each comparator.

The invention has been described with reference to the preferred embodiment. Obviously, modifications and alterations will occur to others upon reading and understanding the proceeding detailed description. In particular, the rule of placing the dots for a new separation on highest available luminance region and in the lowest available thresholds may be satisfied in many different mathematically equivalent ways. For instance, instead of modifying the image, the threshold array may be modified by an equivalent amount, or instead of comparing a pixel to threshold the threshold may be added to the image and compared to a constant value. In addition, the modification amounts stated in the algorithm described earlier may be defined in several different mathematically equivalent ways. Also, while the invention has been described for specific application to a stochastic screen, its benefits of minimal overlap can also be realized for other types of screens. Finally, just like other halftoning methods the method of the present invention may also be utilized in display applications. It is intended that the invention be construed as including all such modifications and alterations insofar as they come within the scope of the appended claims or the equivalents thereof.

Having thus described the preferred embodiment, we now claim:

1. A method of rendering a color image with a plurality of separations on an output device, with a halftone process using a single screen for said plurality of separations, wherein the screen is comprised of a plurality of pixel locations with associated threshold values and the image is comprised of a plurality of separation values, the method comprising steps of:

rendering a first one of the plurality of separations in accordance with the screen, wherein the plurality of pixel locations are turned on or off at a given pixel location based on a comparison of the image separation value at that pixel with the screen threshold value, and rendering a next one of the color separations in accordance with the rendering of the first separation and the screen, wherein for constant image separation values, pixel locations are turned on for the separation at pixel locations disposed in a highest available luminance region of the screen having a lowest available threshold value.

2. The color rendering method in claim 1 wherein the halftone screen is a stochastic screen.

3. The color rendering method as defined in claim 2 wherein the renderings of the next color separations are ordered in accordance with a preselected luminance relation between the color separations.

4. The method in claim 3, wherein the renderings are printings.

5. The color rendering method as defined in claim 4 wherein the relation comprises an increasing luminance for successively rendered separations.

6. The color rendering method as defined in claim 3, wherein the renderings are displays on a screen.

7. The color rendering method as defined in claim 1, wherein the rendering of a separation is in accordance with a conjugate halftone screen.

8. In a color printing system, a method of printing a color document with a halftone process using a single screen for a plurality of color separations wherein the screen is comprised of a plurality of pixel locations associated with successive threshold values, the method comprising steps of:

printing a first one of the plurality of color separations in accordance with the screen, wherein a corresponding first set of screen pixel locations associated with a first set of threshold values are filled by the first one of the color separations; and, printing a next color separation in accordance with the screen, wherein a corresponding second set of screen pixel locations are filled by the next separation, the second set having threshold values successive to the first set of threshold values, whereby the separations are printed for maximal dispersion and optimized spatial frequency response.

9. The color printing method as defined in claim 8 wherein the single screen comprises a stochastic screen representing a set of pixel elements having a range of the successive threshold values for defining relative luminance, and the printing of the next color separation comprises filling second pixel elements having next successive threshold values to threshold values associated with pixel locations filled by the printing of the first one.

10. The color printing method as defined in claim 8 wherein when the printings fill the range of successive threshold values, an overlap filling is first made at a pixel location disposed in a highest available luminance region having a lowest available threshold value.

11. The color printing method as defined in claim 10 further comprising printing a third one of the plurality of color separations, the first, next and third separations being respectively assigned as a printing order, and wherein when the first and next printings fill the range of successive threshold values, the overlap filling for the third one of the printings is limited to a region of consideration comprising successive threshold values filled by the printing of the second one only of the separations.

12. The color printing method as defined in claim 11 wherein when the region of consideration is too small to accommodate the printing of the third one of the color separations, overlap filling occurs in both the region of consideration and a set of lowest available threshold values of the stochastic screen assigned to the printing of the first one of the color separations.

13. The color printing method as defined in claim 11 wherein the printing order corresponds to relative increasing luminance.

14. A method for rendering a contone image by halftoning a plurality of separations comprising steps of:

separating the image into selected contone separations including Black (K), Magenta (M), Cyan (C) and Yellow (Y) represented as $i_K$, $i_M$, $i_C$, $i_Y$, respectively;

thresholding $i_K$ using a stochastic screen to get a binary K output $b_K(m,n)$;

modifying the M separation by a K separation halftone error map;

thresholding $i_M$ using the screen to get a binary M output $b_M$;

modifying the C separation by an M and the K separation halftone error maps;

thresholding $i_C$ using the screen to get a binary C output $b_C$;

modifying the Y separation by an C, the M and the K halftone error maps;

thresholding $i_Y$ using the screen to get a binary Y output $b_Y$; and, rendering the image in accordance with $b_K$, $b_M$, $b_C$ and $b_Y$.

15. The method as defined in claim 1 wherein when the rendering requires an overlap between any of $b_K$, $b_M$, $b_C$ and $b_Y$, the rendering comprises disposing an overlapping separation in a highest available luminance region having a lowest available threshold value.

16. A rendering apparatus for a color image represented in a halftone process by a plurality of separations, comprising:
- a halftoning screen generator for producing a screen having threshold values at pixel locations, wherein the values can be applied to contone image signals to derive a binary image signal suitable to drive the apparatus; and,
- a processor for rendering the color separations over the entire screen, wherein for constant image separation values, pixel locations are turned on for a selected separation at the pixel locations disposed in a highest available luminance region having a lowest available threshold value.

17. The rendering apparatus as defined in claim 16 wherein the screen comprises a stochastic screen.

18. The rendering apparatus as defined in claim 16 wherein the processor renders the separations in accordance with increasing luminance for successively rendered separations.

* * * * *